(12) United States Patent
Recknagel

(10) Patent No.: US 6,799,653 B2
(45) Date of Patent: Oct. 5, 2004

(54) DEVICE FOR SIDE IMPACT DETECTION FOR A MOTOR VEHICLE

(75) Inventor: Rolf-Jürgen Recknagel, Jena (DE)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 10/045,771

(22) Filed: Jan. 10, 2002

(65) Prior Publication Data

US 2002/0112911 A1 Aug. 22, 2002

(30) Foreign Application Priority Data

Jan. 11, 2001 (DE) .......................................... 101 00 881

(51) Int. Cl.[7] .............................................. B60D 1/28
(52) U.S. Cl. ...................................... 180/271; 280/735
(58) Field of Search ................................. 180/271, 274; 280/735; 356/3, 4.01

(56) References Cited

U.S. PATENT DOCUMENTS

| | | | | |
|---|---|---|---|---|
| 5,094,034 A | * | 3/1992 | Freeman | 49/501 |
| 5,179,256 A | * | 1/1993 | Haglund | 200/52 R |
| 5,224,733 A | * | 7/1993 | Simsic | 280/730.2 |
| 5,277,441 A | * | 1/1994 | Sinnhuber | 280/730.1 |
| 5,281,780 A | * | 1/1994 | Haland | 200/52 R |
| 5,435,409 A | * | 7/1995 | Meyer et al. | 180/274 |
| 5,544,716 A | * | 8/1996 | White | 180/274 |
| 5,573,298 A | * | 11/1996 | Walker et al. | 296/188 |
| 6,209,909 B1 | * | 4/2001 | Breed | 280/735 |
| 6,302,474 B1 | * | 10/2001 | Drysdale et al. | 296/146.6 |
| 6,339,369 B1 | * | 1/2002 | Paranjpe | 340/436 |
| 6,536,259 B2 | * | 3/2003 | Mattes | 73/12.09 |

FOREIGN PATENT DOCUMENTS

| | | | | |
|---|---|---|---|---|
| DE | 92 15 383.6 | | 4/1994 | |
| DE | 43 09 827 | | 9/1994 | |
| DE | 44 33 046 | | 3/1996 | |
| DE | 199 27 402 | | 1/2001 | |
| JP | 05254383 A | * | 10/1993 | ........... B60R/21/32 |

* cited by examiner

Primary Examiner—Faye M. Fleming
(74) Attorney, Agent, or Firm—Kenyon & Kenyon

(57) ABSTRACT

A device for side impact detection for a motor vehicle, a side impact being detected using a distance sensor. The distance sensor is preferably designed as an optical sensor, the transmitting power of the optical sensor being adjusted by an initial measuring procedure at the start of operation and by a control circuit during operation.

10 Claims, 2 Drawing Sheets

DEVICE FOR SIDE IMPACT DETECTION FOR A MOTOR VEHICLE

BACKGROUND INFORMATION

It is already known to detect a side impact resulting in a deformation of a side section of the vehicle. Indirect measuring methods, e.g. via an adiabatic pressure rise in a side section of the vehicle, or direct measuring methods, e.g. via a foil strain gauge, are available. A method that functions independently of the side section deformation is side impact detection using an acceleration sensor.

SUMMARY OF THE INVENTION

The device of the present invention for side impact detection for a motor vehicle has the advantage that only real deformations of the side section are detected by the at least one distance sensor, the intrusion speed into the vehicle then also being determinable. As a result, it is possible to control multi-step or even continuous restraining systems in accordance with the situation, since determining the intrusion speed also renders it possible to estimate possible occupant injuries. Moreover, the device of the present invention has a higher degree of robustness with respect to harsh driving maneuvers, since only real deformations of the side section are detected. Finally, distance sensors are also less expensive, thereby resulting in a reduction in costs.

It is particularly advantageous that the distance sensors are designed as optical sensors, infrared light being used in particular. This results in a particularly robust measuring principle, since interference from outside light is eliminated. In the case of such optical distance sensors, light diodes or laser diodes may preferably be used as transmitters, and photodiodes but also bolometers are conceivable as receivers. Ultrasound and microwaves are alternative measuring principles. At the start of operation of the device of the present invention, an initial measuring procedure is advantageously performed in order to optimally adjust the transmitting power, a suitable control circuit adjusting the operating point during operation. Optimal operation of the device of the present invention is, thus, always ensured.

It is also advantageous that either the surface of the stiffening pipe itself is used as the reflector, or, when constructive conditions of the side section require it, the stiffening pipe is connected to a metal plate that then acts as the reflector and is preferably designed as a sheet-metal part. Such constructive situations can be caused by a side window in particular.

Finally, it is also advantageous that a plausibility sensor is present that is used for checking for a side impact, so that false signals from the distance sensors do not trigger restraining means. This plausibility sensor is typically designed as an acceleration sensor. In this instance, other sensor types, such as pressure and temperature, may also be used.

DETAILED DESCRIPTION

A stiffening pipe situated in the side section of a motor vehicle deforms in response to a side impact such that its distance from the inner panel of the side section decreases. At the impact location, this corresponds to a penetration or intrusion speed, which equals the intrusion speed of the object itself. In accordance with the present invention, the intrusion of the stiffening pipe is determined via distance sensors.

Figure 1:
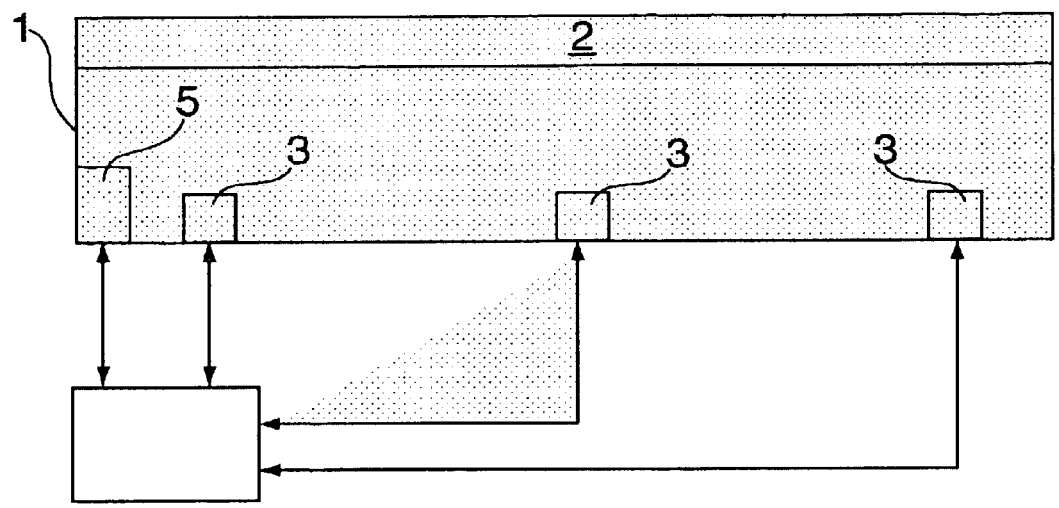
FIG. 1 shows a block diagram of the device of the present invention.

FIG. 1 shows a block diagram of the device according to the present invention. A side section 1 has a door stiffening pipe 2 on the outside of the vehicle and three distance sensors 3 on the inside of the vehicle, the distance sensors each being connected via data inputs/outputs to a control unit 4, which is connected via a fourth data input/output to an acceleration sensor 5, which is also situated in side section 1.

Figure 4:
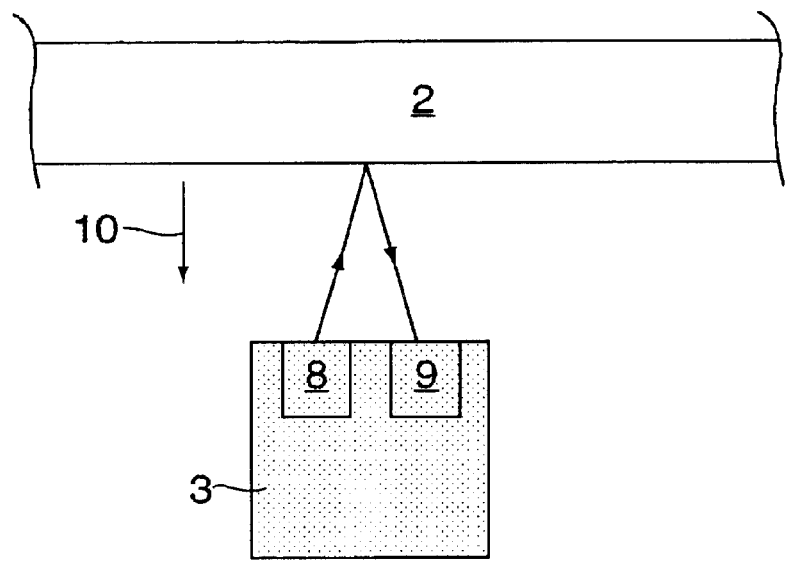
FIG. 4 shows the distance measuring principle.

Control unit 4, which has a processor, controls a restraining system as a function of the sensor signals. Acceleration sensor 5 is used as a plausibility sensor to detect a false side impact signal from distance sensors 3. Distance sensors 3 are represented with their measuring principle in FIG. 4. An optical distance sensor 3, having an optical transmitter 8 and an optical receiver 9, is shown here, the beam direction of transmitter 8 and the receiving direction for receiver 9 being set to a fixed angle at which maximum receiving intensity can be expected. If stiffening pipe 2 moves in direction 10, the intensity of the received optical signals decreases at receiver 9. In this instance, an LED (light emitting diode) is used as the transmitter and a photodiode as the receiver. Alternatively, an ultrasound transmitter and receiver combination and a microwave transmitter and receiver combination are also possible in this instance.

Using a plurality of distance sensors makes it possible to verify and better assess the side impact. Optical distance sensor 3 amplifies, filters, and digitalizes the sensor signals and transmits them to control unit 4 as a digital data stream. Control unit 4 then compares the sensor signals to predefined threshold values to detect a side impact and to determine the intrusion speed. The restraining means are then controlled on the basis of this data. In particular, restraining means refer to airbags and belt tighteners. In this context, the acceleration sensor signals from acceleration sensor 5 are also compared to predefined threshold values, the acceleration signals as well as integrated acceleration signals, i.e., speed signals, being compared to threshold values. Only when acceleration sensor 5 also indicates a side impact does control unit 4 actually trigger the restraining means. Control unit 4 can be situated in side section 1 or outside the side section 1, in which case the sensor signals are transmitted to control unit 4 via a bus or two-wire lines.

Figure 2:
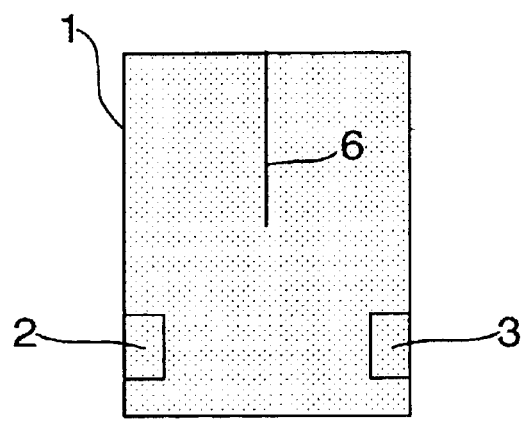
FIG. 2 shows a first side view of the device of the present invention.

FIG. 2 shows a first side view of the device according to the present invention. Stiffening pipe 2 is situated in side section 1, directly opposite optical distance sensor 3. In a retracted state, a plate 6 is over the optical transmission link, between stiffening pipe 2 and optical sensor 3.

Figure 3:
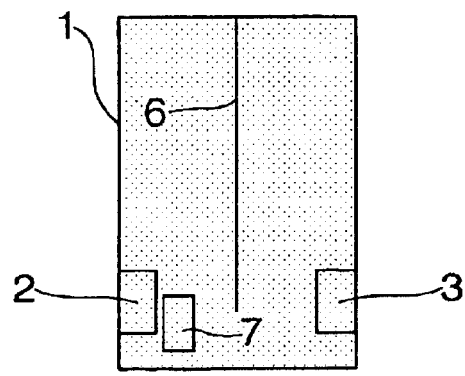
FIG. 3 shows a second side view of the device of the present invention.

FIG. 3 shows a second view of the device according to the present invention. In the retracted state, plate 6 is now so deep that it covers stiffening pipe 2. Therefore, sensor 3 is opposite a reflector sheet 7, which is fixedly connected to stiffening pipe 2, so that a bend in stiffening pipe 2 also causes reflector 7 to bend.

Figure 5:
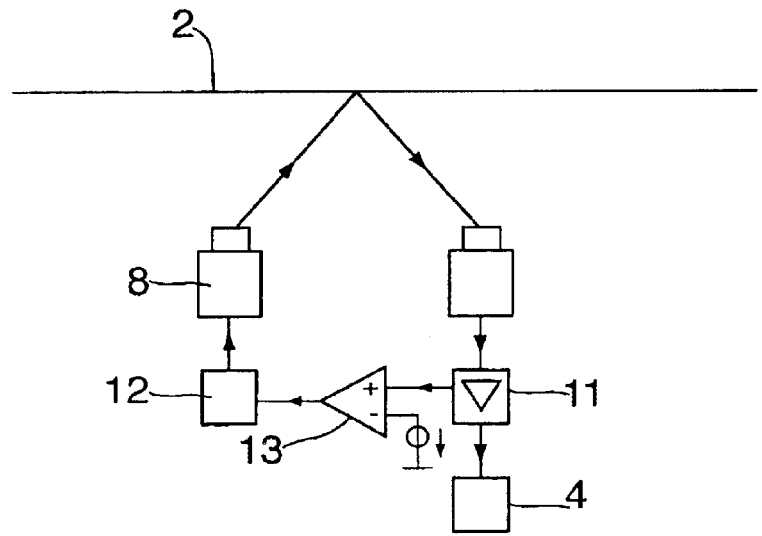
FIG. 5 shows a control circuit according to the present invention.

FIG. 5 shows a control circuit for adjusting (correcting) the operating point of optical sensor 3. This is analogously true for an ultrasound sensor or a microwave sensor. Transmitter 8, the LED in this instance, radiates light at stiffening pipe 2, which is then reflected into receiver 9, the photodiode. Transmitter 8 is operated by a driver circuit 12, which sets the operating point. The output signal of receiver 9 is transmitted to a measuring amplifier 9, which is connected via a first output to control unit 4. Alternatively, it is also possible here for the amplified received signal to undergo another analog-digital conversion before it is transmitted to control unit 4. In this instance, preprocessing, e.g. threshold value comparison, is also possible prior to transmission.

Measuring amplifier 11 is connected via a second output to a positive input of a comparator 13. This output signal of the measuring amplifier, a voltage, is compared, in this instance, to a reference voltage in order to adjust driver circuit 12, which is connected to the output of the comparator, so that transmitter 8 supplies optical power that results in a received signal corresponding to the reference voltage. The transmitting power is, thereby, controlled. In particular, contamination of the stiffening pipe or of the reflector or component changes can be compensated for by this. When using an optical measuring principle it is also possible to use an optical system for transmitter 8 or receiver 9 for focusing.

What is claimed is:

1. A device for side impact detection for a motor vehicle, comprising:

a reflector situated in a side section of the motor vehicle;

a stiffening pipe connected to the reflector, the stiffening pipe being situated in the side section of the motor vehicle;

at least one sensor situated in the side section of the motor vehicle for determining a side section deformation, the at least one sensor including a distance sensor for measuring a distance to the reflector; and a control unit for evaluating sensor signals from the at least one sensor, the control unit detecting a side impact as a function of the distance.

2. The device according to claim 1, wherein the distance sensor is an optical sensor.

3. The device according to claim 1, wherein a surface of the stiffening pipe is the reflector.

4. The device according to claim 1, wherein the stiffening pipe is connected to a metal plate as the reflector.

5. The device of claim 1, wherein the distance decreases in response to the side impact.

6. A device for side impact detection for a motor vehicle, comprising:

a reflector;

a stiffening pipe connected to the reflector, the stiffening pipe being situated in a side section of the motor vehicle;

at least one sensor situated in the side section of the motor vehicle for determining a side section deformation, the at least one sensor including a distance sensor for measuring a distance to the reflector; and a control unit for evaluating sensor signals from the at least one sensor, the control unit detecting a side impact as a function of the distance;

wherein, after a start of operation of the device, the at least one sensor carries out an initial measuring procedure to adjust a transmitting power.

7. The device according to claim 6, further comprising a control circuit, the at least one sensor being connected to the control circuit in order to adjust the transmitting power during operation.

8. A device for side impact detection for a motor vehicle, comprising:

a reflector;

a stiffening pipe connected to the reflector, the stiffening pipe being situated in a side section of the motor vehicle;

at least one sensor situated in the side section of the motor vehicle for determining a side section deformation, the at least one sensor including a distance sensor for measuring a distance to the reflector;

a control unit for evaluating sensor signals from the at least one sensor, the control unit detecting a side impact as a function of the distance; and a plausibility sensor situated in the side section.

9. The device of claim 8, wherein the plausibility sensor includes an accelerometer.

10. A device for side impact detection for a motor vehicle, comprising:

a reflector;

a stiffening pipe connected to the reflector, the stiffening pipe being situated in a side section of the motor vehicle;

at least one sensor situated in the side section of the motor vehicle for determining a side section deformation, the at least one sensor including a distance sensor for measuring a distance to the reflector; and a control unit for evaluating sensor signals from the at least one sensor, the control unit detecting a side impact as a function of the distance;

wherein the at least one sensor is protected from interference by outside light.

* * * * *